Oct. 2, 1951 P. F. SPREMULLI 2,570,078
STIRRER AND FEEDER
Filed Feb. 9, 1950 2 Sheets-Sheet 1
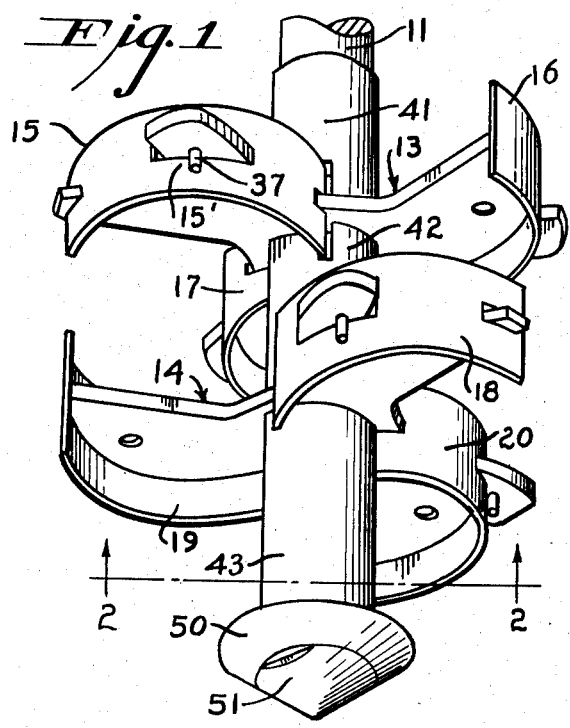
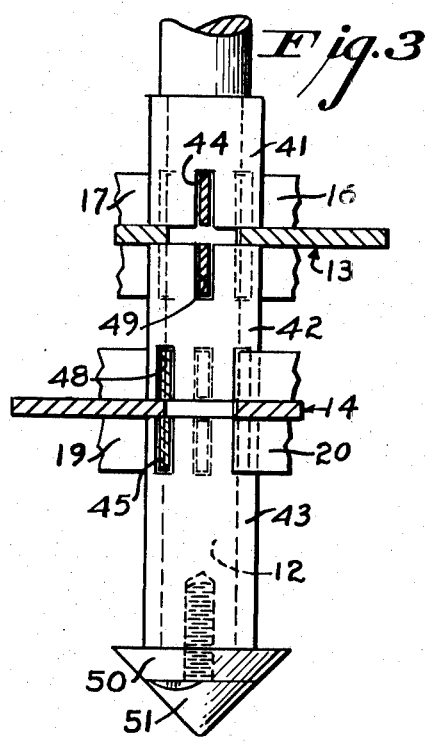
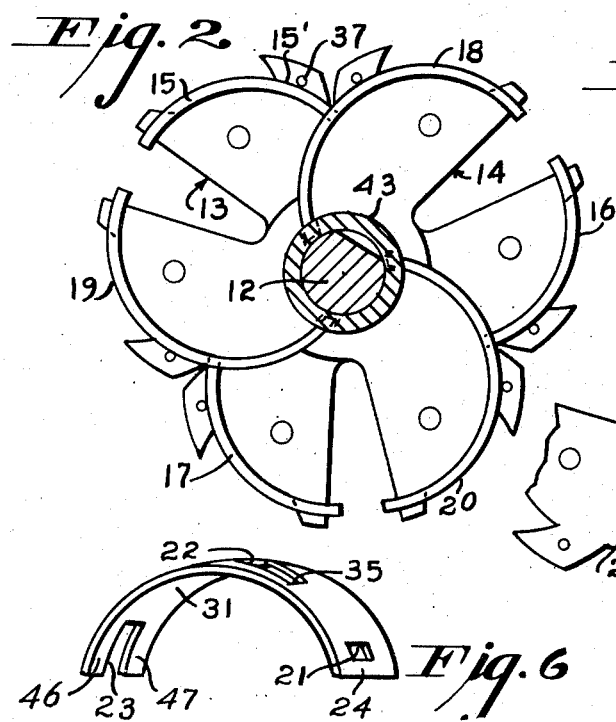
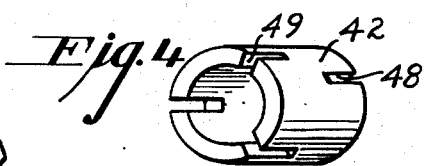
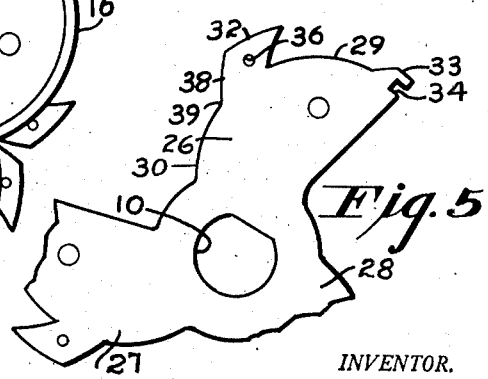
INVENTOR.
PAUL F. SPREMULLI
BY
ATTORNEY

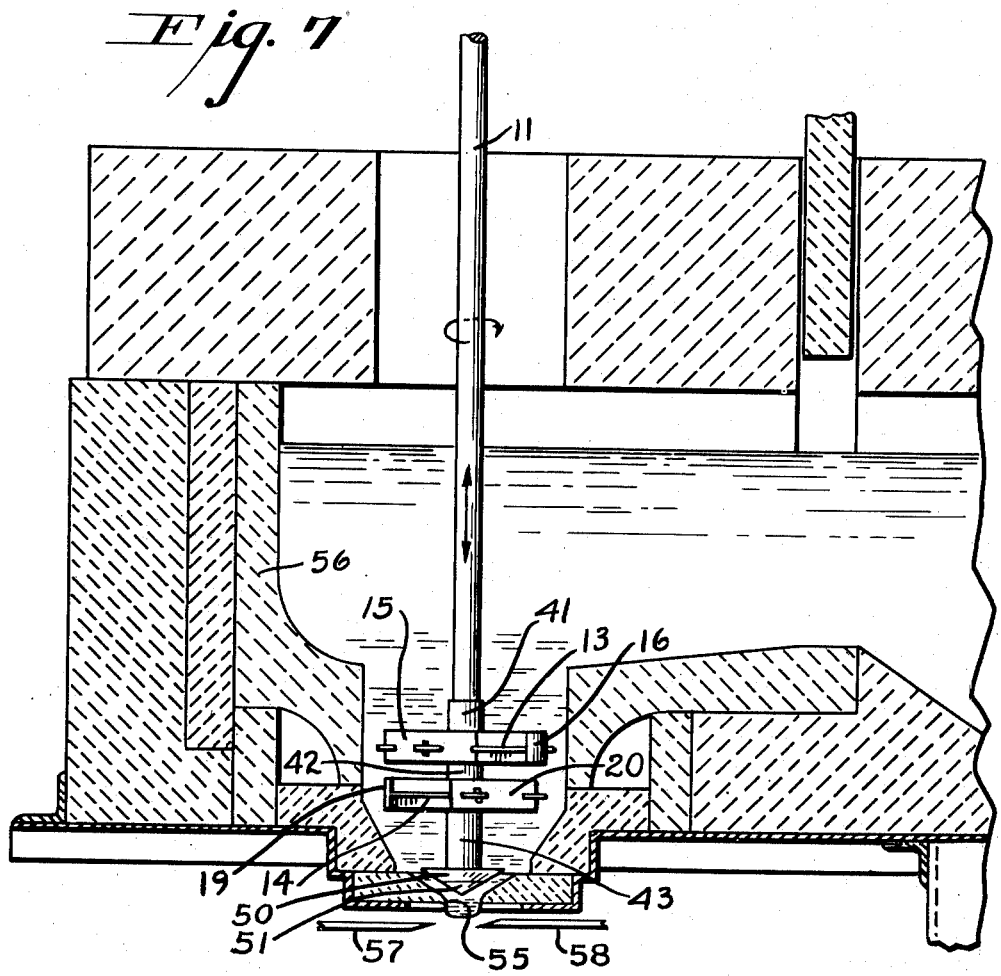

Patented Oct. 2, 1951

2,570,078

UNITED STATES PATENT OFFICE 2,570,078

STIRRER AND FEEDER

Paul F. Spremulli, Corning, N. Y., assignor to Corning Glass Works, Corning, N. Y., a corporation of New York Application February 9, 1950, Serial No. 143,273

16 Claims. (Cl. 49—55)

The present invention relates to stirrers and feeders for molten glass, and is particularly directed to stirrer arrangements and assemblies adapted for use in accordance with the disclosure in the pending application of C. F. De Voe, Serial No. 609,876, filed August 9, 1945.

The stirring of molten glass is most effective, as indicated in such De Voe application, when the stirrer is arranged for continuous rotation in a surrounding housing through which the molten glass to be stirred is passed, and which laterally confines the stirrer within a space preferably affording no greater clearance than needed for freedom of movement of the stirrer. Where such housing and the stirrer are arranged for downward passage of the molten glass to be stirred, with issuance of the stirred glass for working as required from the outlet in the lower end of the housing either by gravity or by extrusion through periodic downward movement of the stirrer, however, it has been found desirable to make suitable provision for controlling the rate of glass flow through such outlet in order to insure uniformity of quality as well as quantity.

Certain nonprecious metals, such as molybdenum, which are substantially inert with respect to various glass compositions, should be quite satisfactory for use in such stirring of such glasses. It has been found, however, that all but the simplest unitary and integral forms of stirrer fabricated from such a metal as by welding or brazing are frequently structurally weak or otherwise unsatisfactory in practice, a particularly disadvantageous factor in the combined stirring and feeding operation indicated above. To overcome such disadvantage, resort must be had to the separate fabrication of the several parts of the stirrer in a manner in which they can be mechanically connected together into a complete assembly.

Accordingly, a primary object of the present invention is the provision of a simplified and highly practicable stirrer assembly for such purpose, the several parts of which can be readily mechanically connected into the complete assembly, as well as readily disassembled for replacement or repair.

A related object is the provision of such a stirrer assembly in which the several parts are arranged in interlocked relation.

A further primary object of the invention is to provide such stirrer assembly with cooperative means to effectuate and facilitate control of the flow of stirred glass from the outlet in the lower portion of a housing in which such stirrer assembly is adapted to be arranged for the stirring of molten glass that is being passed downwardly therethrough for the purpose of being fed to a suitable glassworking apparatus.

Referring now to the accompanying drawings, Fig. 1 is a perspective view of a preferred form of stirrer assembly embodying the invention.

Fig. 2 is a view on line 2—2 of Fig. 1.

Fig. 3 is an elevational fragmentary view of such assembly partly in section.

Fig. 4 is a perspective view of a sleeve portion of such assembly.

Fig. 5 is a plan view of a fragment of an impeller support of such assembly.

Fig. 6 is a perspective view of an impeller of such assembly.

Fig. 7 is a sectional view in elevation of a fragment of a forehearth and of a glass-feeding bowl including a cylindrical housing containing the stirrer assembly shown in Fig. 1.

The stirrer illustrated comprises a shaft 11 having a reduced noncircular end section 12 carrying impeller support or web members 13 and 14. Members 13 and 14 in turn symmetrically support thereabout impellers 15, 16, and 17, and impellers 18, 19, and 20 respectively. The aperture, such as 10 in Fig. 5, in each of the members 13 and 14 through which section 12 of shaft 11 passes is of substantially the size and cross-sectional configuration as shaft section 12 to key members 13 and 14 thereon. Having particular reference to Fig. 6, each impeller comprises a rectangular sheet or strip of metal bent to arcuate configuration about an axis parallel to the axis of shaft 11. Each impeller is provided with a square perforation 21 near one end, of a dimension slightly greater than the thickness of web or support members 13 and 14; a rectangular aperture 22, of the width of aperture 21, intermediate its ends; and a similar aperture or open-ended slot 23 in the opposite end.

Having particular reference to Fig. 5, each of the web or support members has three symmetrically arranged radiating portions 26, 27, and 28, each having arcuate edge portions curved about an axis parallel to the axis of shaft 11, such as portions 29 and 30, for abutment against the inner surface, such as surface 31 (Fig. 6) of a supported impeller and projections, such as projections 32 and 33, for passage through impeller perforations 22 and 21.

When an impeller is properly abutted against the arcuate edge portions 29 and 30 of a support, that portion 24 (Fig. 6) bordering aperture 21 occupies a notch 34 (Fig. 5) in projection 33, and that portion bordering the end of the aperture 22 (Fig. 6) opposite end 35 occupies the line of juncture 39 (Fig. 5) of support surfaces 30 and 38. With the impeller in the above described position, an aperture 36 through projection 32 just clears the outer surface such as 15' (Fig. 1) of the impeller so that by tightly fitting a pin 37 through aperture 36 the impeller is rigidly held to the support.

In the assembly of the impeller equipped supports 13 and 14 on shaft 11, support 13 is threaded onto shaft section 12 between sleeve members 41 and 42, and support 14 is threaded on section 12 between sleeve members 42 and 43. Sleeves 41 and 43 are similar, each having one end provided with slots such as 44 and 45 adapted for occupancy by impeller ends 46 and 47 (Fig. 6), thereby positively anchoring them to one another to enable them to collectively withstand torque to which they are subjected during rotation of the assembly. Sleeve 42 differs from sleeves 41 and 43 in that it serves to suitably space the impeller groups from one another on shaft section 12 and has end slots 48 and 49 adapted to register with the oppositely disposed slots 45 and 44 of end sleeves 43 and 41 respectively. Sleeves 41, 42 and 43 and supports 13 and 14 occupy the full length of shaft section 12 and are held in place thereon by a washer 50 and a conical-headed cap screw 51.

The washer 50 is preferably of a larger maximum diameter than sleeve 43, and has its undersurface in the form of a truncated cone as shown. The base diameter of the conical head of cap screw 51 is the same as the small diameter of washer 50, so that when the washer and cap screw are assembled on shaft 12, they form an integral unit. With the stirrer assembly positioned in a relatively closely confining cylindrical housing through which molten glass is to be passed for stirring and feeding, such as illustrated, for example, in Fig. 7 wherein the stirrer assembly is shown axially arranged over the bottom outlet 55 of a housing comprising a conventional glass-feeding bowl 56, such integral unit serves as a conical flow-control element or valve in cooperation with the portion of the housing adjoining such outlet, such housing portion being shaped accordingly.

The diameter of washer 50 is greater than the diameter of sleeve 43 for the dual purpose of better suiting integral unit 50—51, which may obviously also be made as a single piece, for use as a flow-control valve and for use in aiding the stirrer assembly in its gobbing action when it is axially reciprocated within the cylindrical housing provided by bowl 56. Conventional equipment (not shown) may be employed to rotate the stirrer assembly, to axially reciprocate it and to adjust the vertical position of the stirrer assembly within bowl 56 with respect to outlet 55. Similarly, shear blades 57 and 58, shown arranged below outlet 55, may be operated in synchronization with the axial movement of the stirrer assembly by conventional equipment. Obviously, the size of the washer 50 is determined by the outlet diameter of the housing and/or to some extent by the viscosity at which the molten glass is stirred in and issued from the housing. The conical undersurface jointly provided by washer 50 and the head of cap screw 51 also reduces the danger of stagnant glass accumulating thereon when integral unit 50—51 is used solely for flow control; it also tends to eliminate the formation of blisters on the end of the shaft, especially during reciprocation of the stirrer assembly.

Operation

With the stirrer assembly as shown, low-viscosity glass can be flow-fed at a rate dependent on the head of glass maintained and by the adjusted height of the flow-control element with respect to outlet 55. On the other hand, with more viscous glass, mold charges can be periodically extruded from outlet 55 by axial movements of the stirrer assembly. As will be understood, in either method of operation there is continuous rotation of the stirrer assembly to improve the quality of the glass as it passes through the cylindrical housing.

The present invention was in part disclosed in my pending application for patent filed June 19, 1947, Serial No. 755,658, now abandoned, of which this application is a continuation-in-part.

What is claimed is:

1. In a stirrer for molten glass, an arcuately shaped impeller having a perforation therethrough near one end and another perforation therethrough intermediate its ends, and an open-ended slot at its opposite end, and a supporting element for said impeller having an arcuate edge abutted against the impeller and having projections occupying the perforations in the impeller, said impeller slot being also occupied by a portion of said support.

2. In a stirrer, such as defined by claim 1 wherein the one projection has a notch therein occupied by the impeller and another projection is perforated, and a pin is provided which passes through the perforated projection to lock the impeller in fixed relation to said supporting element.

3. In a stirrer for molten glass, a shaft having a longitudinal section of noncircular configuration, an impeller support having an aperture of the size and configuration of the noncircular shaft section threaded thereover, said support having portions radiating from its center and each of which has an arcuate outline portion with projections, and arcuately shaped perforated impellers of the radius of the arcuate outlines of said portions of said support abutted thereagainst and with the support projections occupying the perforations in said impellers.

4. In a stirrer for molten glass, a shaft, a slotted and apertured impeller, an impeller support through which said shaft passes in keyed relation thereto, said support having projecting parts occupying the impeller apertures and having a portion occupying the impeller slot, one of said projecting parts having a notch therein into which the impeller fits, and means passing through one of the projecting parts cooperative with said impeller to hold it fixed with respect to said support.

5. In a stirrer for molten glass, a shaft having a noncircular longitudinal section of a reduced cross-section, an assembly threaded onto and occupying the full length of said section comprising a series of three slotted sleeves and two impeller supports interposed between the two end sleeves and the middle sleeve respectively, a plurality of impellers attached to each of said supports each having one of its ends terminating in the slots of two of said sleeves, and means for holding said sleeves and supports on said shaft.

6. In a stirrer for molten glass, a shaft having a noncircular longitudinal section of a reduced cross-section, an assembly threaded onto and occupying the full length of said section comprising a series of three slotted sleeves and two impeller supports interposed between the two end sleeves and the middle sleeve respectively, a plurality of impellers each having apertures therein through which portions of said support project and having an open slotted end which straddles a portion of the support and then enters the slots of two of said sleeves, and means for holding said sleeves on said shaft.

7. In a stirrer for molten glass, a rotatable shaft, a flat support threaded on said shaft in fixed relation thereto having a laterally radiating portion provided with a curved edge and with a projection beyond such edge, and an impeller having a broad surface abutted against said curved edge having an aperture occupied by said projection and having a slotted end straddling said support.

8. A structure such as defined by claim 7, wherein the projection of said support has a notch occupied by a portion of said impeller.

9. In a stirrer for molten glass, a shaft having an assembly threaded thereon comprising two slotted sleeves and an impeller support interposed therebetween, a plurality of impellers attached to said support each having one of its ends terminating in a slot of each sleeve, and means for holding said sleeves and support rigidly on said shaft.

10. In a stirrer for molten glass, an impeller support provided with laterally spaced outwardly extending projections, and an impeller having a slotted end straddling said support and having perforations each occupied by one of said projections.

11. A stirrer such as defined by claim 9, wherein the means for holding said sleeves and support on said shaft includes an element of a diameter exceeding that of said sleeves.

12. A stirrer such as defined by claim 9, wherein the means for holding said sleeves and support on said shaft comprises a conically shaped device forming the end of the shaft and having a maximum diameter exceeding that of said sleeves.

13. A glass-stirring and glass charge-extruding apparatus comprising a cylindrical housing adapted for the downward flow of molten glass therethrough and provided with a bottom outlet, a rotatable and axially movable shaft in axial alignment with said outlet and having threaded thereon two slotted sleeves and an impeller support interposed therebetween, a plurality of impellers attached to said support each having one of its ends terminating in a slot of each sleeve, and means for holding said sleeves and support rigidly on said shaft, said means comprising a conically shaped device forming the end of said shaft and having a maximum diameter exceeding that of said sleeves, the apex portion of said device being lowermost, the portion of the housing adjoining said outlet being so shaped that the conically shaped device, in cooperation therewith, serves to control the rate of flow of glass through the outlet.

14. A glass-stirring and glass charge-extruding apparatus comprising a cylindrical housing adapted for the downward flow of molten glass therethrough and provided with a bottom outlet, a rotatable and axially movable shaft within said housing in axial alignment with said outlet, a set of arcuate impeller elements radially projecting from said shaft into the proximity of the housing wall, a web member having radiating portions extending in a plane normal to the axis of said shaft, each such portion having an arcuate edge adjoining the curved inner surface of one of said elements, and a conically shaped device carried by the lower end of said shaft and having a maximum diameter substantially exceeding that of the shaft, the apex portion of said device being lowermost, the portion of the housing adjoining said outlet being so shaped that the conically shaped device, in cooperation therewith, serves to control the rate of flow of glass through the outlet.

15. A glass-stirring and glass charge-extruding apparatus comprising a cylindrical housing adapted for the downward flow of molten glass therethrough and provided with a bottom outlet, a rotatable and axially movable shaft within said housing in axial alignment with said outlet, a set of arcuate impeller elements radially projecting from said shaft into the proximity of the housing wall, and a conically shaped device carried by the lower end of said shaft and having a maximum diameter substantially exceeding that of the shaft, the apex portion of said device being lowermost, the portion of the housing adjoining said outlet being so shaped that the conically shaped device, in cooperation therewith, serves to control the rate of flow of glass through the outlet.

16. A glass-stirring and glass charge-extruding apparatus comprising a cylindrical housing adapted for the downward flow of molten glass therethrough and provided with a bottom outlet, a rotatable and axially movable shaft within said housing in axial alignment with said outlet, a set of arcuate impeller elements radially projecting from said shaft into the proximity of the housing wall, and flow-control means carried by the lower end of said shaft and comprising a member of substantially greater diameter than the shaft, the portion of the housing adjoining the outlet being so shaped that said member, in cooperation therewith, serves to control the rate of flow of glass through the outlet.

PAUL F. SPREMULLI.

REFERENCES CITED

The following references are of record in the file of this patent:

UNITED STATES PATENTS

| Number | Name | Date |
|---|---|---|
| 120,097 | Potter | Oct. 17, 1871 |
| 120,849 | Broyrill | Nov. 14, 1871 |
| 1,048,025 | Anthony | Dec. 24, 1912 |
| 1,074,397 | Westly | Sept. 30, 1913 |
| 1,084,210 | Howard | Jan. 13, 1914 |
| 1,281,610 | Lundahl | Oct. 13, 1918 |
| 1,374,843 | Flaherty | Apr. 12, 1921 |
| 1,612,658 | Soubier | Dec. 28, 1926 |
| 1,884,427 | Wardley | Oct. 25, 1932 |
| 2,033,075 | Howard | Mar. 3, 1936 |
| 2,100,760 | Wadsworth | Nov. 30, 1937 |
| 2,254,236 | Myers | Sept. 2, 1941 |